O. C. EARP-THOMAS.
ANALYTICAL TESTING APPARATUS.
APPLICATION FILED APR. 23, 1917.
1,280,194. Patented Oct. 1, 1918.
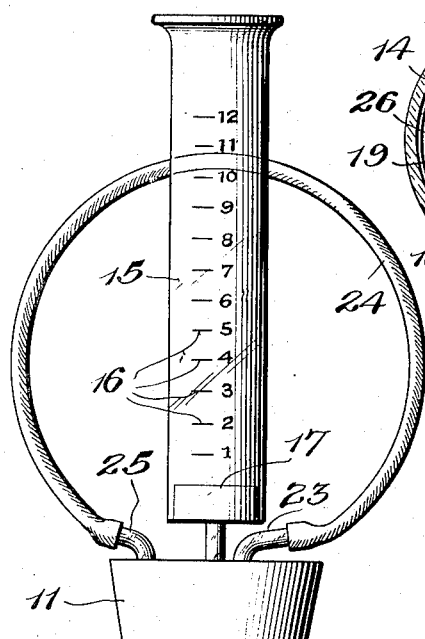
Fig. 1.
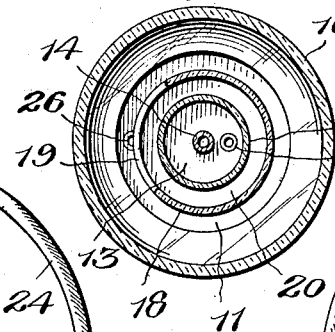
Fig. 3.
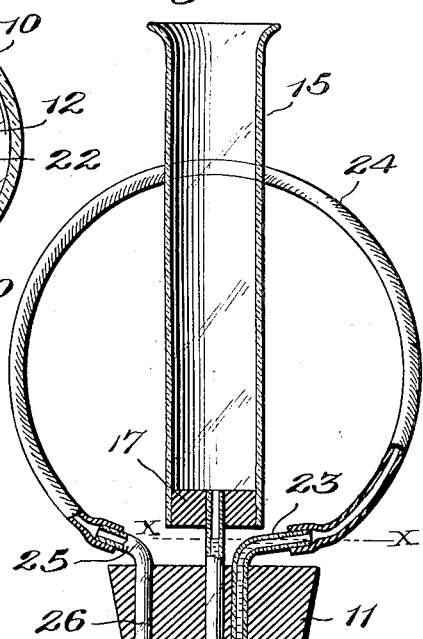
Fig. 2.
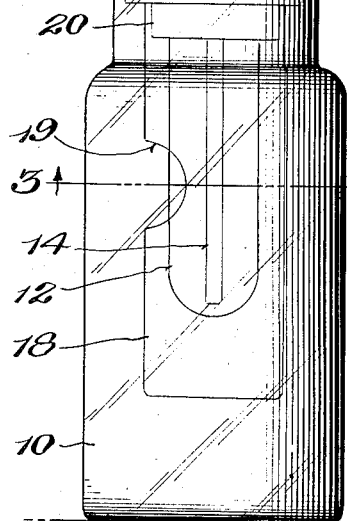
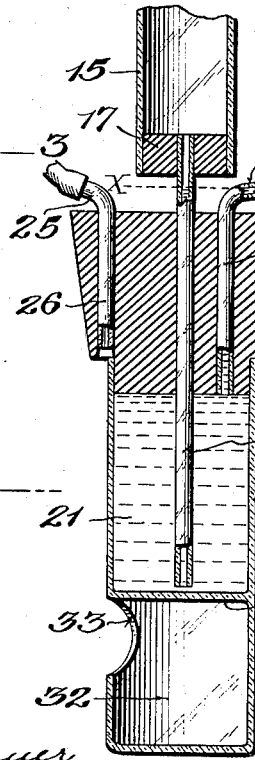
Fig. 4.
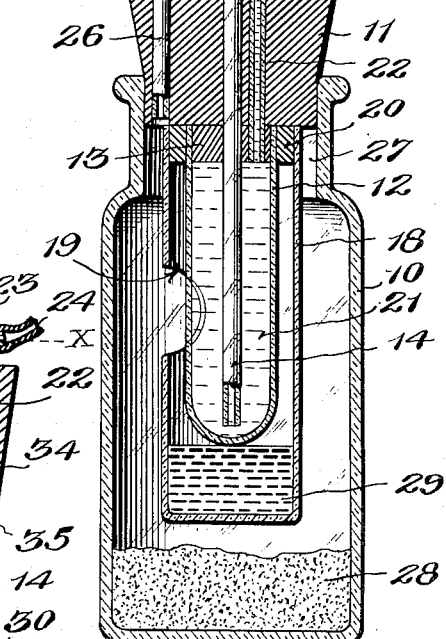
Witness
Chas. L. Griesbauer.
Inventor
O. C. Earp-Thomas,
by
R. F. Steward
his Attorney

UNITED STATES PATENT OFFICE.

OSWALD C. EARP-THOMAS, OF BLOOMFIELD, NEW JERSEY.

ANALYTICAL TESTING APPARATUS.

1,280,194.   Specification of Letters Patent.   Patented Oct. 1, 1918.

Application filed July 23, 1917. Serial No. 182,340.

*To all whom it may concern:*

Be it known that I, OSWALD C. EARP-THOMAS, who have declared my intention to become a citizen of the United States, residing at Bloomfield, in the county of Essex and State of New Jersey, have invented certain new and useful Improvements in Analytical Testing Apparatus; and I do hereby declare the following to be a full, clear, and exact description of the invention, such as will enable others skilled in the art to which it appertains to make and use the same.

This invention relates to analytical testing apparatus; and it relates more particularly to apparatus for testing soils or other substances from which a gas is evolved upon treatment with a suitable reagent such as an acid.

The principal object of the invention is to provide a simple, compact and self-contained apparatus of simple, strong, and inexpensive construction which can be readily used by farmers and others as a soil tester, and by means of which a substantially accurate estimation of the amount of a constituent of the soil can be rapidly obtained, even though the user be entirely unfamiliar with analytical chemical methods. Another object is to provide apparatus of the foregoing general description which is relatively small in size and capable of being packed into small compass for transport, in the pocket, for example, and which is thus especially adapted for use in field work.

In its best form the apparatus comprises a reaction vessel or chamber provided with an appropriate closure adapted to seal the vessel against communication with the exterior except as hereinafter noted. The vessel closure is arranged to support within the vessel a reagent receptacle; and also to support gage means adapted to indicate the degree of pressure within the vessel. Such gage means may comprise a reservoir adapted to contain a supply of an indicating liquid, such as water, the reservoir being located inside the vessel and communicating by means of a suitable conduit or passage through the closure with a graduated water gage or index tube carried by and above said closure. The liquid supply reservoir does not open directly into the reaction vessel but communicates therewith indirectly and in such manner that increase of gaseous pressure within the vessel is transmitted to the upper surface of the liquid in the reservoir, liquid being thereby forced therefrom into the graduated index tube before mentioned. In the best form of the invention, the arrangement of the gage means is such that upon charging the gage means with water or the like, preparatory to making a test, the liquid automatically assumes its proper starting or zero level.

In order to more fully explain the features of the invention and its mode of operation, certain desirable embodiments thereof are shown in the accompanying drawings, but these embodiments are to be understood only as illustrating the principles of the invention and not as restricting the invention to the specific constructional details shown. In these drawings:—

Figure 1 is an assembly view of one form of the apparatus in side elevation;

Fig. 2 is a central longitudinal section of the same;

Fig. 3 is a transverse section on the line 3—3 of Fig. 1; and

Fig. 4 is a partial view, in section, of a modification.

Referring particularly to Figs. 1, 2 and 3 of the drawings, 10 represents the reaction vessel which is here shown as an ordinary wide-mouthed glass bottle; a 4-ounce bottle is very suitable, as a rule. The bottle is provided with a closure member 11, in this instance a rubber stopper fitting snugly within the mouth of the bottle 10. 12 is a liquid supply reservoir forming part of a pressure gage device. The reservoir may take the form of an ordinary short glass test tube, provided with a stopper 13. Through this stopper, and through stopper 11, a relatively small bore glass tube 14 extends upwardly from near the bottom of reservoir 12 into the bottom of glass gage or index tube 15, provided with suitable graduations 16 and constituting another part of the gage device aforesaid. If preferred, the small tube 14 and index tube 15 may be made as a unit; but since it is usually desirable to interpose between them a flexible connection in order to avoid breakage by rough handling, and since it is convenient to have the index tube readily disconnectible when not in use, a better plan is to form the index tube open at the bottom, as shown, and to use a closely fitting perforated rubber plug or stopper 17 to effect the connection between it and tube 14.

Surrounding reservoir 12, is another glass tube 18 of somewhat larger diameter, constituting a reagent receptacle, which may advantageously extend somewhat farther down into the reaction chamber than said reservoir and which is in direct communication with said chamber as by means of lateral opening 19. The reagent receptacle 18 may be held in proper position with respect to the reservoir 12 in any suitable manner. In the present example this is accomplished by means of rubber gasket 20 fitting snugly around the upper end of reservoir 12, and fitting snugly within the upper end of receptacle 18.

It is evident that there is no direct communication between the gage reservoir 12 and the reaction chamber in the vessel 10; but provision is made for connecting them indirectly in such manner that pressure within the reaction chamber is communicated freely to the upper surface of liquid 21 contained in reservoir 12. This may be accomplished in various ways, but the arrangement here shown by way of illustration is a simple and effective mode of attaining this result. A small bore glass tube 22 extends through the stoppers 13 and 11, and is here shown as terminating in a short bend at 23, above stopper 11, and adjacent the base of the index tube. By means of a detachable conduit such as a piece of rubber tubing 24, the bend 23 is connected to the bent upper end 25 of another small bore glass tube 26 which extends downwardly through a suitable perforation provided in stopper 11 and leads into the annular space 27 between the reagent receptacle and the reaction vessel. This arrangement, while of course variable within the scope of the invention, has several distinct advantages. Thus, by rendering the pressure-transmitting conduit capable of being opened, as at the junction of rubber tube 24 and the upper end 23 of tube 22, an overflow means is provided whereby correct automatic leveling of liquid charged into the gage device is insured. The same object might be attained by use of a suitably located 3-way cock, for example, if a fixed conduit were preferred to the detachable rubber tube connection shown; but the present arrangement facilitates rapid disassembling and compact packing of the apparatus when necessary, and hence offers practical advantages.

From the foregoing description it is apparent that in the particular construction explained, the stopper 11 carries attached to itself the complete gage means, and also the reagent receptacle; so that all these parts practically constitute a structural unit, removable as a whole from the reaction vessel or bottle 10. In the arrangement illustrated, the attachment of the specified parts to the stopper or closure 11 is frictional and is effected directly or indirectly by means of the plug 13, washer 20, and tubes 14, 22 and 26.

In the customary mode of using the apparatus thus far described, the stopper 11 with all the parts attached thereto is removed from the reaction vessel and the sample 28, consisting of a known weight of soil or other material to be tested, is placed in the reaction vessel 10. With the rubber tube 24 disconnected from tube terminal 23, water or any other suitable liquid is poured in at the upper end of index tube 15, and passing downwardly through tube 14, it fills the reservoir 12 and overflows at 23, the starting or zero level being finally established in tubes 14 and 22, approximately as indicated by the dotted line $x$—$x$. Before or after the gage reservoir has thus been charged, the proper amount of dilute hydrochloric acid 29, or other appropriate reagent, is introduced into the receptacle 12 through the lateral opening 19. The stopper 11 is next crowded firmly into the mouth of the bottle, and the rubber tube 24 is finally slipped over the tube end 23, the apparatus then being in the condition shown in Fig. 3, and ready for the test to proceed. By tilting the apparatus sufficiently, the acid 29 may be emptied into the reaction chamber and into contact with the sample 28. Assuming the latter to be a sample of soil containing calcium carbonate, for example, the result of the reaction between the acid and the soil will be an evolution of carbon dioxid gas. This tends to increase the pressure in the reaction vessel, which pressure is transmitted by way of the described conduit means to gage reservoir 12, the level of the water in the latter, being thus forced down, while the water escapes upwardly through tube 14 into the graduated tube 15, the water continuing to rise in the tube 15 until the reaction in the bottle 10 is completed. The tube 15 may be of course graduated in any convenient units, but where the apparatus is to be used as a soil tester it is generally convenient to graduate the tube to read in tons of calcium carbonate per acre. From the level attained by the liquid in tube 15, the operator can immediately read off on the scale the degree of alkalinity of the soil sample in terms of the units employed in practice. He can thus ascertain in a very simple and expeditious manner just what the condition of the soil is in this respect and can readily determine what, if any, correction by liming or otherwise is necessary to put the soil in proper condition. It is to be understood, of course, that the apparatus has previously been standardized or calibrated by means of a test substance of known composition.

The exact order in which the various operations are performed in preparing the apparatus for use, is of course immaterial for the most part. But in any case, the rubber tube 24 should not be slipped over the terminal 23 until the cork 11 is firmly seated, because otherwise the liquid level x—x would be disturbed. Greater delicacy in the gage readings can obviously be obtained by narrowing the index tube 15.

It is obvious that various changes can be made in the structural details of the apparatus without sacrificing the advantages characterizing the broad invention. For example, the gage reservoir and the reagent receptacle may be combined in a unitary structure as shown in Fig. 4, where a single glass tube 30 is divided by means of a diaphragm or partition 31 into an upper reservoir for the liquid 21, and a lower reservoir 32 for acid or other reagent, a lateral opening 33 for introducing the reagent into the receptacle and discharging it therefrom being provided as before. In this form of the apparatus, moreover, the rubber stopper 34 is simply reduced or shouldered at 35 for snug frictional engagement with tube 30, thus obviating the necessity for using a separate plug, such as plug 13 in Fig. 2, to secure the depending reservoir to the stopper. The construction illustrated in Fig. 4 has the advantage also of permitting the use of a wider diameter tube for the water reservoir, with consequent increase in capacity. This is especially useful where the samples to be treated run high in the constituent to be determined.

In the foregoing detailed description, the parts have been referred to as constructed of certain specific materials, but it is to be understood that these materials are mentioned merely as typical of materials ordinarily most suitable for the purposes in view, and that the invention is not limited to the use of the particular materials in question.

Wherever the gage means and reagent receptacle are referred to herein as supported by or attached to the reaction vessel closure, this is to be understood in a broad sense as designating any arrangement of the general character involved in which the members or parts in question are so attached to the closure, either directly or indirectly, as to be removable together as a connected whole from the reaction vessel.

What I claim is:

1. Testing apparatus comprising, in combination, a reaction vessel, a closure therefor, a gage reservoir supported by said closure within said vessel but having no direct communication therewith, a reagent receptacle opening directly into said reaction vessel and also supported by said closure, means whereby gaseous pressure developed within said reaction vessel is communicated to said reservoir, and a gage tube supported by said closure outside the reaction vessel, said gage tube communicating with said reservoir and being arranged to receive liquid forced therefrom by pressure developed in the reaction vessel.

2. Testing apparatus comprising, in combination, a reaction vessel, a closure therefor, a gage tube mounted on the outer side of said closure, a gage reservoir supported from the inner side of said closure within said vessel and below said gage tube, conduit means leading from the lower part of the gage reservoir to the gage tube, an overflow conduit leading from the gage reservoir upwardly to a point of discharge adjacent the lower part of said gage tube, and means for transmitting gaseous pressure from the reaction vessel to the discharge end of said overflow conduit.

3. Testing apparatus comprising, in combination, a reaction vessel, a closure therefor, liquid level gage means supported by said closure and arranged to indicate pressures in said reaction vessel, and an overflow for said gage means arranged substantially at the same level as the starting or zero level on the gage.

4. Testing apparatus comprising, in combination, a reaction vessel, a closure therefor, liquid level gage means carried by said closure and in operative communication with the interior of the reaction vessel, and provision for permitting the gage means to overflow when being charged with liquid and thus to automatically set itself at the proper starting level.

5. Testing apparatus comprising, in combination, a reaction vessel, a closure therefor, a liquid gage reservoir depending from the under side of said closure and exposed to the pressure existing in said vessel, a gage tube surmounting said closure and arranged to receive liquid forced upwardly from said reservoir, and a reagent receptacle substantially coaxial with said reservoir and also depending from said closure.

6. Testing apparatus comprising, in combination, a reaction vessel, a closure therefor, a liquid gage reservoir depending from the under side of said closure and exposed to the pressure existing in said vessel, and a gage tube flexibly mounted on the upper side of said closure, said gage tube being arranged to receive liquid forced upwardly from said reservoir.

7. In testing apparatus, the combination with a closure member, of a reagent receptacle, a liquid reservoir, and an indicator device communicating with said reservoir, all supported by said closure member.

8. A soil tester comprising, in combination, a bottle, a stopper therefor, a reservoir tube supported within the bottle from the under side of said stopper and closed against direct communication with said bottle, a gage or index tube mounted on the upper side of said stopper and in liquid-receiving communication with the lower part of said reservoir tube, an overflow conduit extending from the reservoir tube through the stopper, another conduit extending through the stopper from the space between the reservoir tube and the bottle walls, and flexible tube means connecting the upper ends of the two said conduits.

9. A soil tester comprising, in combination, a wide mouthed bottle, a stopper therefor, a gage reservoir and a reagent receptacle both supported within the bottle by said stopper, said reservoir being closed against direct communication with the inside of the bottle, but said receptacle opening directly into the bottle, a gage tube supported above the bottle by said stopper, a tube extending through said stopper and connecting said indicator tube with the lower part of said reservoir, an overflow tube leading from said reservoir through the stopper to a point adjacent the lower portion of the gage tube, and means whereby the outer end of said overflow tube may be placed in free communication with the interior of the bottle.

10. Testing apparatus comprising, in combination, a reaction vessel, a closure therefor, a gage reservoir located within said vessel but having no direct communication therewith, a reagent receptacle opening into said reaction vessel, means whereby pressure developed within said reaction vessel is communicated to said reservoir, and a gage tube supported outside the reaction vessel, said gage tube communicating with said reservoir and being arranged to receive liquid forced therefrom by pressure developed in the reaction vessel.

In testimony whereof I hereunto affix my signature.

OSWALD C. EARP-THOMAS.